United States Patent [19]

Halsey

[11] Patent Number: 5,052,276
[45] Date of Patent: Oct. 1, 1991

[54] DIAPHRAGM CONSTRUCTION

[76] Inventor: George H. Halsey, 63 Shady Dr., Indiana, Pa. 15701

[21] Appl. No.: 539,218

[22] Filed: Jun. 18, 1990

[51] Int. Cl.⁵ .......................... F01B 19/00; F16J 3/00
[52] U.S. Cl. .................................... 92/90; 92/93; 92/98 R; 92/103 R; 92/103 F; 92/103 SD
[58] Field of Search ............... 92/84, 89, 90, 93, 96, 92/97, 98 R, 103 R, 103 F, 103 SD; 417/437

[56] References Cited

U.S. PATENT DOCUMENTS

| | | | |
|---|---|---|---|
| 2,208,149 | 7/1940 | Vernet | 92/84 |
| 2,267,280 | 12/1941 | Kuhnel | 92/103 F |
| 2,439,849 | 4/1948 | Fawick . | |
| 2,712,793 | 7/1955 | Holm | 92/84 |
| 2,789,580 | 4/1957 | Woods | 92/90 |
| 2,843,151 | 7/1958 | Greenawalt | 92/84 |
| 2,962,974 | 12/1960 | Porkert | 92/84 |
| 2,971,470 | 2/1961 | Wein et al. | 92/103 R |
| 3,367,575 | 2/1968 | Davis | 92/103 R |
| 4,327,629 | 5/1982 | Frey . | |
| 4,505,450 | 3/1985 | Saarem et al. . | |
| 4,619,436 | 10/1986 | Bonzer et al. . | |

FOREIGN PATENT DOCUMENTS

| | | | |
|---|---|---|---|
| 863065 | 11/1952 | Fed. Rep. of Germany | 92/89 |
| 1453608 | 5/1969 | Fed. Rep. of Germany | 417/437 |
| 1906808 | 9/1969 | Fed. Rep. of Germany | 417/437 |
| 1378242 | 10/1964 | France | 92/90 |
| 914538 | 12/1960 | United Kingdom | 92/84 |
| 993385 | 6/1963 | United Kingdom | 92/90 |

Primary Examiner—John T. Kwon
Assistant Examiner—Thomas Deniow
Attorney, Agent, or Firm—Thomas P. Liniak

[57] ABSTRACT

An improved diaphragm, which operates and has the structure of a short-thick beam, is comprised of a plug having a channel, a tire cord reinforcement is bonded to the plug, an elastomer cured to the reinforcement means, and a sleeve bonded to the elastomer. This diaphragm is capable of being used in many applications, particularly, fluid-handling devices.

16 Claims, 5 Drawing Sheets

DIAPHRAGM CONSTRUCTION

BACKGROUND OF THE INVENTION

1. Field of the Invention

This invention relates to a diaphragm construction and, more particularly, diaphragm construction that embodies the structural characteristics of a short, thick beam.

Diaphragms, according to this invention, provide a higher pressure, more reliable, more durable and less costly diaphragm than previously achieved in prior art diaphragms. In a preferred embodiment, the diaphragm is constructed of a plug having a channel, tire cord reinforcement bonded to the plug and secured in the channel, an elastomer cured onto the tire cord, and a sleeve bonded to the outer circumferential surface of the elastomer.

2. Description of the Prior Art

It is known to use diaphragms in conjunction with pressurized devices, such as pumps. Exemplary of prior art diaphragms are various well-known fabric-reinforced, rubber and metal diaphragms, and seals, such as disclosed in U.S. Pat. No. 4,327,629 to Frey. Pressure and piston motion place diaphragm material under tension. All of these prior art constructions, however, are almost entirely dependent upon the tensile strength of a thin membrane to control pressure within a system.

One type of well-known diaphragm is the fabric reinforced diaphragm. The center portion of the diaphragm sits on the piston, while the outer edge of the diaphragm is clamped to the outer cylindrical housing. As the piston reciprocates, the center portion of the diaphragm is successively moved upwardly and downwardly, thereby convoluting the diaphragm, by alternatively turning it inside out and back again. The diaphragm ideally forms a flexible wall between a pumping chamber within the cylindrical housing and the piston. As the piston moves, it convolutes, and the volume of the chamber varies. With such a pump, the circumferential edge of the diaphragm near the rim of the piston experiences significant stress and is subject to tearing and other fluid leakage, permitting working fluid to flow between the piston and the cylinder and to travel to other parts beyond the piston.

Fabric-reinforced diaphragms have commonly been constructed of calendared square woven fabric cut and/or cured to a desired diameter and shape. While this particular diaphragm material has many end uses, especially in actuators, the diaphragm suffers from the constraint that it can only be used in medium to low pressure applications, commonly up to 150 psi.

Some other known diaphragms have been constructed of rubber. These diaphragms are molded rubber products that provide a thin rubber "gap". While the rubber diaphragm is low in cost, it suffers from the drawback of being able only to be operated at very low pressures.

Metal diaphragms have also been developed. These diaphragms can be used in pressures up to 35,000 psi in stages for low (metering) quantities. While these high pressures are desirable in some instances, the cost of these metal diaphragms, even for a 500–1000 psi low throughput device, is prohibitively high, commonly, around $30,000.

A well-known seal is disclosed in U.S. Pat. No. 4,327,629 to Frey. Frey discloses a seal for a cylinder piston arrangement having an elastic tube member sealingly engaging the piston and a working chamber. The tube member stretches and contracts, and the working chamber varies in volume upon relative movement of the piston and the cylinder. This seal will operate efficiently as long as the sealing tube does not experience fatigue. However, generally, the elastomer in the sealing tube will experience fatigue after a relatively small number of cycles, because the tube is under significant stress and is subject to tearing.

Diaphragms, according to this invention, can operate at sufficiently high pressures to replace the traditional piston pumps used in many hydraulic systems. In these pumps, the working fluid must be finely filtered of contaminants (on the order of 10–30 microns) and should be of a lubricating composition. The working fluid must be filtered in order to reduce the likelihood that contaminants will lodge themselves between moving elements of the device. The choice of working fluids is thus greatly limited to mainly petroleum-based liquids. Otherwise, contaminants in the working fluid could ultimately cause either the pump or the entire system to fail. In many prior art pumps, the mechanical tolerances between the piston and piston chamber are very small, in order to achieve acceptable pumping characteristics. Even if unfiltered contaminants do not cause system-wide failure, these contaminants may cause undesirable friction and wear, if they are allowed to get in between the piston and the chamber, and, thereby, reduce the efficiency of the pump. Therefore, it is very advantageous, and for most applications, necessary, to remove these contaminants.

The filtering process can also have a negative effect on the pressure realized by the device which the diaphragm is used in. Specifically, because the fluid must pass through a filter which may have entrapped contaminants therein, the flow can be impeded and the resultant pressure of the system is reduced.

In view of the above, it is apparent that the prior art diaphragms are capable of operating only at a limited range of pressures, require clean lubricating working fluid in alternate piston type hydraulic pumps, and cannot withstand the tremendous number of cycles required to meet the demands of the marketplace. Also, the cost becomes prohibitively high in order to meet the demand for a diaphragm that can operate over an extended range of pressures and at a large number of cycles. Finally, because the diaphragms are under such significant stresses and are subject to tearing and fluid leakage which permits the working fluid to flow between the piston and the cylinder, the choice of working fluids becomes unduly limited. Therefore, it would be advantageous to develop a low cost diaphragm which would substantially alleviate significant stresses on the critical elements of the diaphragm, while operating over a large range of pressures, and substantially reduce the deleterious effects which result when the working fluid leaks between the piston and the cylinder.

It is apparent, from the above, that there exists a need in the art for a diaphragm which is low cost, can be operated for a large number of cycles without developing material failure, and which can be operated over an extended range of pressures, but which, at the same time, overcomes the problems in the prior art diaphragms.

SUMMARY OF THE INVENTION

In order to avoid the aforementioned problems associated with previous prior art diaphragms, various fluid handling devices (such as hydraulic pumps) can be equipped with an improved diaphragm, according to the present invention, such that the pump comprises (a) a housing which includes a cylindrical inner surface closed off at one end with a front wall, (b) a solid cylindrical resilient plug encircled by the cylindrical inner surface, the plug being spaced at a distance from the front wall, and (c) a cylindrical liner between the plug and the cylindrical inner surface, the plug being sealedly bonded to the liner and the liner being sealedly bonded to the cylindrical inner surface. Between the plug and the front wall is a pumping chamber into which and from which fluid flows. Embedded in the plug is a piston which is reciprocatable along the axis of the plug.

The improved diaphragm of the present invention depends upon a construction that allows the diaphragm to act as a short-thick beam, rather than a thin membrane in tension, as it encounters various forces. The elastomer between the outer sleeve and the inner plug of the present diaphragm acts as a beam to counteract the forces applied thereto. The basis behind the short-thick beam theory is that the length of the beam is shortened and the vertical thickness of the beam is increased, which results in a beam which deflects only a relatively small amount, but which is structurally strong enough to operate over a large number of cycles while being exposed to an extended range of pressures. Mathematically speaking, the deflection of the short-thick beam can be expressed as:

$$f = \frac{PL^4}{6.4Eh^3},$$

where f = the deflection of the beam; P = pressure (psi); L = length of beam or gap between beam supports (or in the case of the diaphragm, the distance between the inner plug and outer sleeve); E = modulus of elasticity; and h = vertical height of beam (in the case of the diaphragm of the present invention, the height of the inner plug). If it is assumed that the pressure (P) and the modules of elasticity (E) are the same between a short-thick beam diaphragm and a prior art diaphragm, then the deflection of the beams is proportional to the ratio of $L^4/h^3$.

In prior art diaphragms, the length (L) is typically greater than the height (h) of the diaphragm. Therefore, the deflection (f) of a prior art diaphragm is commonly greater then 1. However, the length (L) of a short-thick beam may be small, such that, for example, $L^4$ equals 0.0002 inches, while the height (h) of the short-thick beam may be, for example, 1.5 inches, such that $h^3 = 3.375$. Therefore, the ratio of $L^4/h^3$ is commonly much less than one. From the above analysis, it is clear that if the deflection of the gap in the diaphragm is kept small and the beam still operates under pressures applied to prior art diaphragms, this small deflection will allow the short-thick beam diaphragm to operate over a much larger number of cycles than prior art diaphragms, because the prior art diaphragms will experience fatigue due to the attenuated deflection.

Also, the short-thick beam diaphragm will be able to operate over an extended range of pressures because the prior art diaphragms would fail at higher pressures as their deflections would become prohibitively large. From the above equation, the deflection (f) is proportional to the pressure (P) multiplied by the ratio of $L^4h^3$, assuming E is the same between both diaphragms. In the prior art diaphragm, as explained above, $L^4h^3$ is commonly greater than 1. Therefore, as P increases, the deflection (f) increases approximately in a one-to-one relationship. It is clear that only a certain value of P can be reached in the prior art diaphragms until the maximum f is achieved. Conversely, the ratio of $L^4/h^3$ for the short-thick beam diaphragm is generally much less than one. Thus, as P is increased, the deflection (f) only slightly increases. Therefore, a higher range of pressure can be utilized with the short-thick beam diaphragm until the critical f value is achieved.

During the operation of the pump, by reciprocating the piston, the elastomer deforms—the circumferential surface thereof remaining fixed—to vary the volume of the pumping chamber and to achieve a pumping action. Conversely, by forcing fluid into and from the pumping chamber, the elastomer deforms and the piston reciprocates. The embedded portion of the piston is preferably conical to relieve stress. Because the fluid is isolated to the chamber and no contact occurs with the working fluid, substantially any unfiltered fluid, water, or even air or other gases can be employed as a working fluid in the present pump.

The present invention also combines the advantages found in a short, thick beam design with other advantages, including durability over a large number of cycles and a low incidence of bonding and/or material fatigue problems.

This invention fulfills these needs by providing a diaphragm, comprising: a plug; a reinforcement means secured to the plug, such that the reinforcement means and the plug form a base; an elastomer, such that the elastomer is secured to said base; and a cylindrical metallic sleeve, such that said sleeve encircles said elastomer and said base, and is secured to said elastomer.

Many of the problems experienced by the prior art diaphragms, as above described, are overcome or greatly mitigated by the subject invention. First, this invention can be operated over an extended range of pressures, up to 1500 psi or higher. Second, the cost of this invention is low, as compared to $30,000 for some prior art diaphragms. Third, this invention can be operated over a large number of cycles, namely, in excess of two million to ten million cycles. Finally, this invention will allow the use of non-petroleum based and/or "unclean" working fluids in high-pressure systems, so that the dangers associated with such fluids, such as combustion, are eliminated.

The preferred system, according to this invention, offers the combination of the following advantages: excellent durability; good economy; high strength for safety; ease of assembly; smooth operation; reduced operating noise; and good stability. In fact, in many of the preferred embodiments, these factors of durability and high strength are optimized to an extent considerably higher than heretofore achieved in prior known diaphragms.

It is a purpose of this invention to fulfill this and other needs in the art in a manner apparent to the skilled artisan, once given the following disclosure.

DETAILED DESCRIPTION OF THE INVENTION

Figure 1:
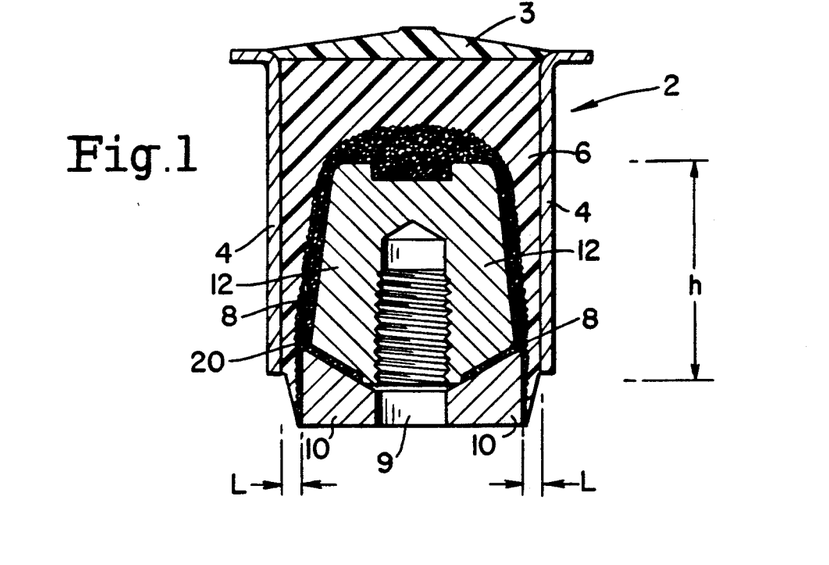
FIG. 1 is a cross-sectional view of the diaphragm according to the present invention.

Referring to FIG. 1, diaphragm 2 according to the invention is shown. Diaphragm 2 comprises barrier 3, sleeve 4, elastomer 6, reinforcing/bonding layer 8, and plugs 10 and 12.

Diaphragm 2 acts as a short-thick beam because the height (h) is significantly greater than the length (L).

Barrier 3 is, preferably, constructed of natural rubber. However it can be constructed of Silicon, Viton or Kalrez, or other resilient material. The exposed surface of barrier 3 or elastomer 6 can be of any desired shape to accommodate a desired design objective. Sleeve 4 is preferably constructed of aluminum, steel, brass or bronze. Plugs 10 and 12 are preferably constructed of machined aluminum bar or precision aluminum castings. Sleeve 4 is shown here as cylindrical, but it should be understood that it could also take on other shapes. Also, steel, brass or reinforced plastic can be used as the material for plugs 10 and 12. Elastomer 6 is a passenger tire tread stock. The polymers in this material are preferably 85% natural and 15% synthetic blend rubber (SBR). However, special applications may require other polymers. For example, other applications may use Viton, Silcon, EPDM, peroxide-cured nitrile or a polyacralate polymer. Layer 8 is, preferably, constructed of a calendared passenger tire cord. The rubber calendared onto the tire cord is a natural rubber compound. The tire cords are of an 8-40-2 construction with 28 ends per inch. Other choices for cord 8 would be to change cord construction (ends, denier, strands, and twist), end count, or materials. Some other tire cord materials that can be utilized are steel and arimid.

Figure 2:
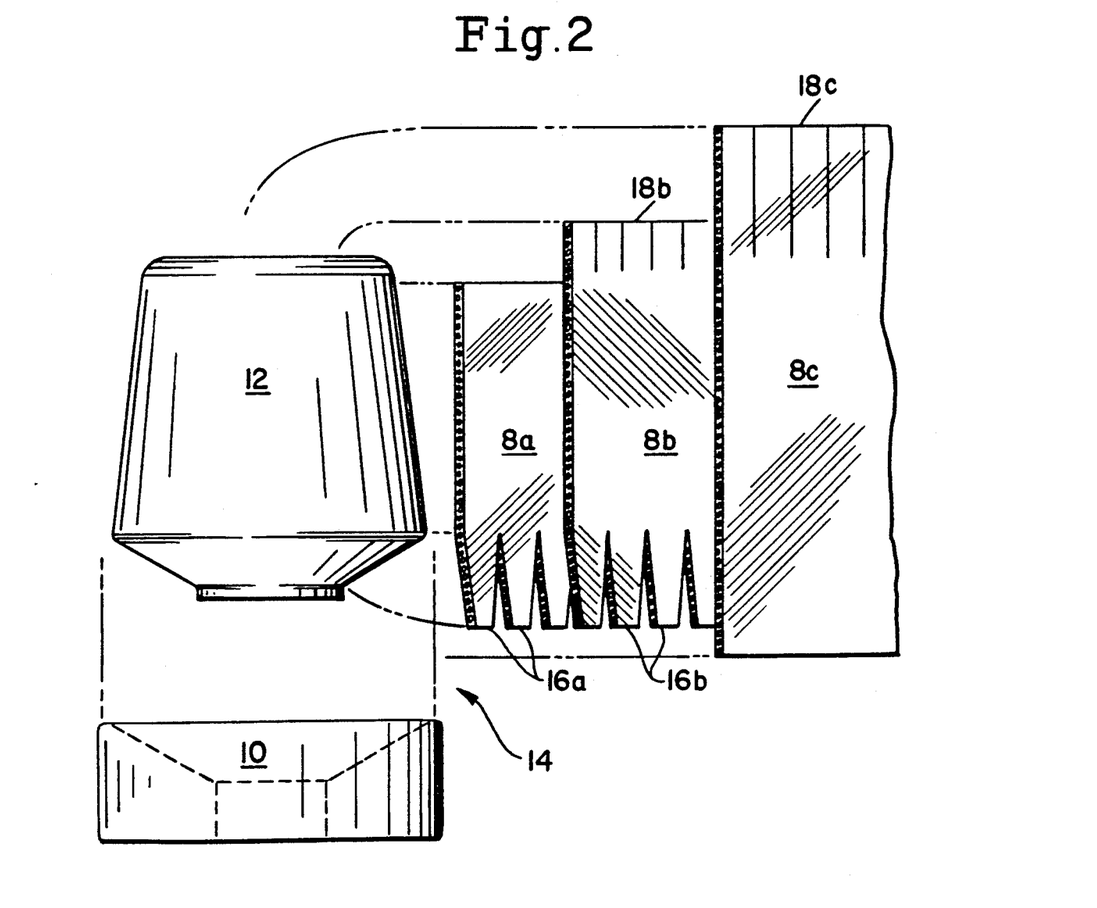
FIG. 2 depicts the assembly of the materials used in the diaphragm according to the present invention.

As shown in FIG. 2, tire cord layers 8a, 8b, 8c, which are dipped in a conventional chemical preparation that aids the bonding process, are bonded to one another and to plugs 10 and 12, and wrapped over top of plug 12 in order to provide a durable, stable base 14 upon which elastomer 6 and sleeve 4 are placed.

When constructing base 14, first, tire cord 8a is tacked to plug 12. Tails 16a are wrapped underneath plug 12 and tacked by a bonding adhesive prior to the compression and curing steps that actually bond the materials to each other. The preferred bonding adhesives are a Chemlock 205 and a Chemlock 220, both manufactured by the Lord Corporation. Second, layer 8b is tacked to layer 8a, such that layer 8b is biased at an angle, with respect to layer 8a. This biasing provides a stronger bond between the layers. Tail 16b is wrapped underneath plug 12 and tacked to tails 16a, and heads 18b are tacked to the top of plug 12. Plug 10 is then tacked to layer 8b and tail 16b, such that channel 20 is created. Layer 8c is tacked to layer 8b, such that layer 8c is biased at an angle with respect to layer 8b, and heads 18c are tacked to plug 10 and heads 18b, in order to provide a durable base 14. It is to be understood that while three layers 8a, 8b, 8c are shown, various numbers of layers of cord 8a, 8b and 8c can be used in order to meet a variety of customer demands.

After cords 8a, 8b and 8c are biased, with respect to one another, and tacked to plugs 10 and 12, sleeve 4, which is coated on its interior with the aforementioned bonding material, is placed around base 14. Elastomer 6 is then compressed into sleeve 4, such that layer 6 becomes semi-liquid and flows into sleeve 4 and around cords 8a, 8b and 8c. This compression causes the elastomers on cords 8a, 8b and 8c to come into intimate contact, which creates a strong bond between the cords when cured. Barrier layer 3 is then pressed against sleeve 4 and elastomer 6. The entire diaphragm 2 is then heated in any conventional curing press, preferably for about 45 minutes at 320° F. and at 8 tons of pressure.

Figure 3:
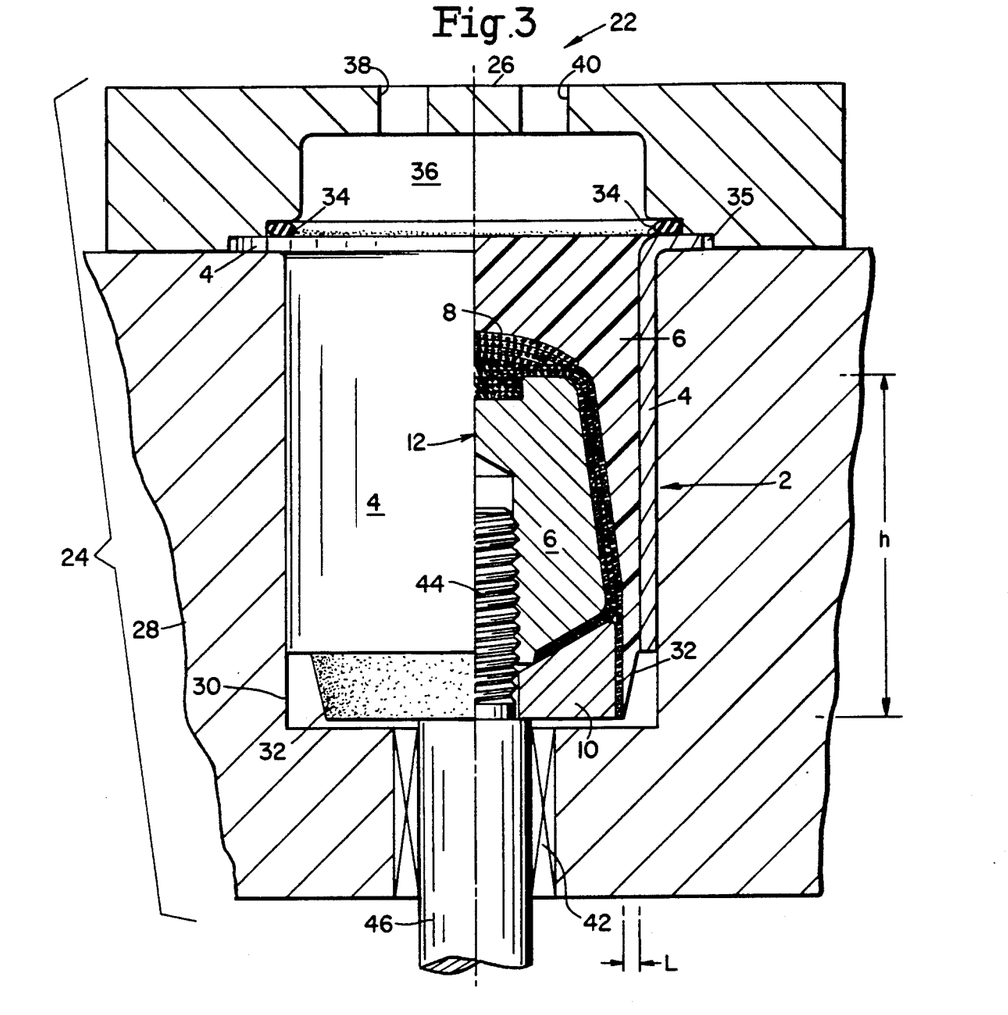
FIG. 3 is a sectionalized view of the diaphragm according to the present invention.

FIG. 3 depicts the application of diaphragm 2 in one of its many end uses, namely a hydraulic pump 22. Pump 22 comprises a housing 24 which includes a front wall 26 and a pump body 28. Pump body 28 is hollow and has a first cylindrical inner surface 30. Encircled by surface 30 is a cylindrical sleeve 4 which is coaxial with surface 30. Encircled by sleeve 4 is elastomer 6. Elastomer 6 is a solid cylinder containing layer 8, the outer circumferential surface of which is sealingly bonded to the inner periphery of sleeve 4 along the axial length of sleeve 4.

Elastomer 6, it is noted, includes resilient layer 32 which is positioned axially beyond the edge of sleeve 4. Sleeve 4 is seated in place by O-ring 34. The outer annular edge of sleeve 4 is retained in a fixed position in notch 35, sandwiched between front wall 26 and pump body 28.

Between elastomer 6 and front wall 26, and spaced radially inward from O-ring 34, is a space which defines pumping chamber 36. Fluid enters pumping chamber 36 through inlet 38, and exits through outlet 40.

Referring again to elastomer 6, piston 42 is shown embedded in plugs 10 and 12. Piston 42 includes head portion 44. When piston 42 advances, force is applied to plugs 10 and 12 and elastomer 6. Elastomer 6 acts like an incompressible fluid and distributes the force to various locations and in directions which reduce stress on surface bonds. The force of piston 42 causes elastomer 6 to deform, which decreases the volume of chamber 36 as piston 42 advances. When piston 42 withdraws, elastomer 6 returns to a position in which the volume of chamber 42 is increased.

FIG. 3 also clearly depicts one application of the short-thick beam diaphragm theory. Clearly, the vertical height (h) of diaphragm 2 is substantially larger than the length (L) of diaphragm 2. The deflections of diaphragm 2, as calculated by the aforementioned equation, should be relatively small. Therefore, diaphragm 2 may operate over a large number of cycles and over an extended range of pressures.

The design, as shown in FIGS. 1-3, overcomes many problems associated with the prior art. For instance, pump 22 can operate efficiently at pressures up to 2000 psi, whereas not all prior art diaphragms can operate efficiently at this pressure range. Also, pump 22 can operate over a range of pressures up to 1500 psi for a number of cycles that exceed one million. Many prior art diaphragms cannot withstand this pressure range over this large number of cycles.

Figure 4:
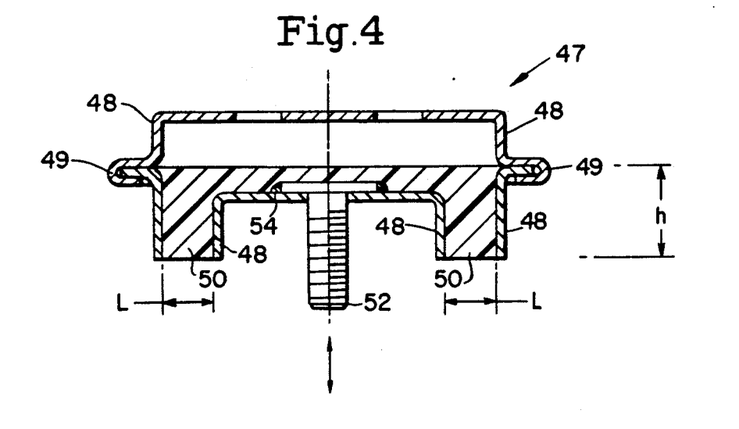
FIG. 4 is a cross-sectional view of another embodiment of the diaphragm for use in low pressures according to the present invention.

With reference to FIG. 4, a short-thick beam diaphragm for use in low pressure applications will be described. Diaphragm 47 is comprised of housing 48, crimp seal 49, elastomer 50, piston 52, and weldments 54. Elastomer 50 is bonded to housing 48. This diaphragm construction is designed for use in pressures up to 150 psi, as opposed to prior art low pressure diaphragm which operate only up to 10 psi, and can be employed as replacements for gear pump or vane pump. One advantage of diaphragm 47 over prior art diaphragms is that diaphragm 47 can be operated over a large number of cycles, and is also relatively inexpensive.

Again, low-pressure diaphragm 47 operates under the short-thick beam diaphragm theory because the length (L) of diaphragm 47 is slightly smaller than the height (h) of diaphragm 47, which results in small deflections of diaphragm 47, if the aforementioned equation is applied. Because the length (L) is only slightly smaller than the height (h), diaphragm 47 is more adversely affected by changes in pressure than other embodiments of the present invention, so diaphragm 47 must be limited to low-pressure applications.

Figure 5:
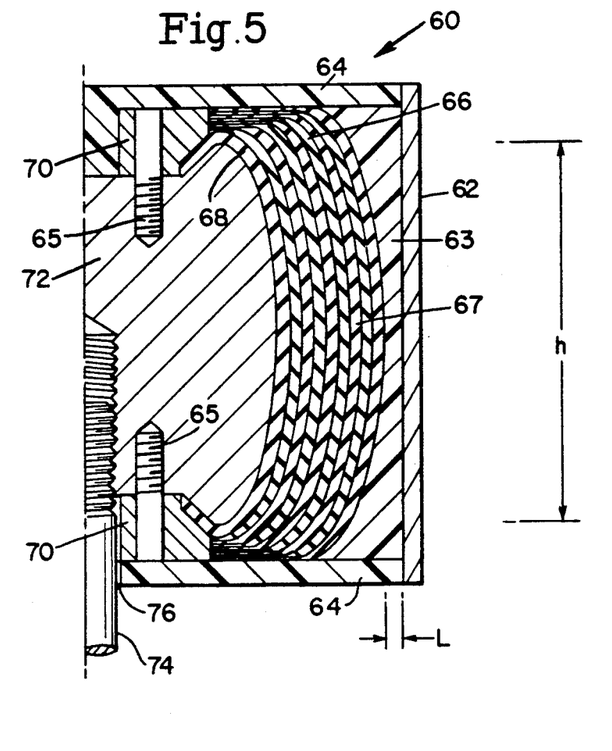
FIG. 5 is a cross-sectional view of another embodiment of the diaphragm according to the present invention.

FIG. 5 shows another embodiment of the present invention. Double-acting diaphragm 60 is comprised of sleeve 62, elastomer 63, barrier disk 64, bias plies 66 in which optional gum strips 67 can be placed, bias plies 68, clamping ring 70, plug 72 and piston 74. Diaphragm 60 is manufactured using the same aforementioned method. Elastomer 63 is bonded to sleeve 62, and plies 68 are bonded to plug 72. This embodiment differs from the embodiment depicted in FIGS. 1-3, in that plies 66 and plies 68 differ as to the angle of their respective bias. Preferably, plies 68 have a 0° bias and plies 66 can be any bias angle. This change in the bias provides a more durable diaphragm. Also, if seal 76 is added to piston 74, this embodiment will provide twice the amount of pumping, for example, while subjecting diaphragm 60 to the same amount of stress as diaphragm 2.

Because diaphragm 60 is commonly secured to the inner cylinder of the chamber of a pump, for example, the reciprocating motion of plug 72 only occurs in elastomer 64 between plies 66 and 68, and between outer plies 66 and sleeve 62. This is desirable because the bonds between elastomer 63 and plies 66 and 68 are stronger bonds than the cement-to-metal or rubber-to-cement bonds at the plug interface. The pressure in elastomer 63 tends to lock the materials together, making good bonds in this area even better. Keeping the piston motion from occurring at the metal-to-elastomer interface, by subjecting plies 66 and 68 to the motion, allows the pressure to help the bond strength at the second and third ply interfaces.

Figure 6:
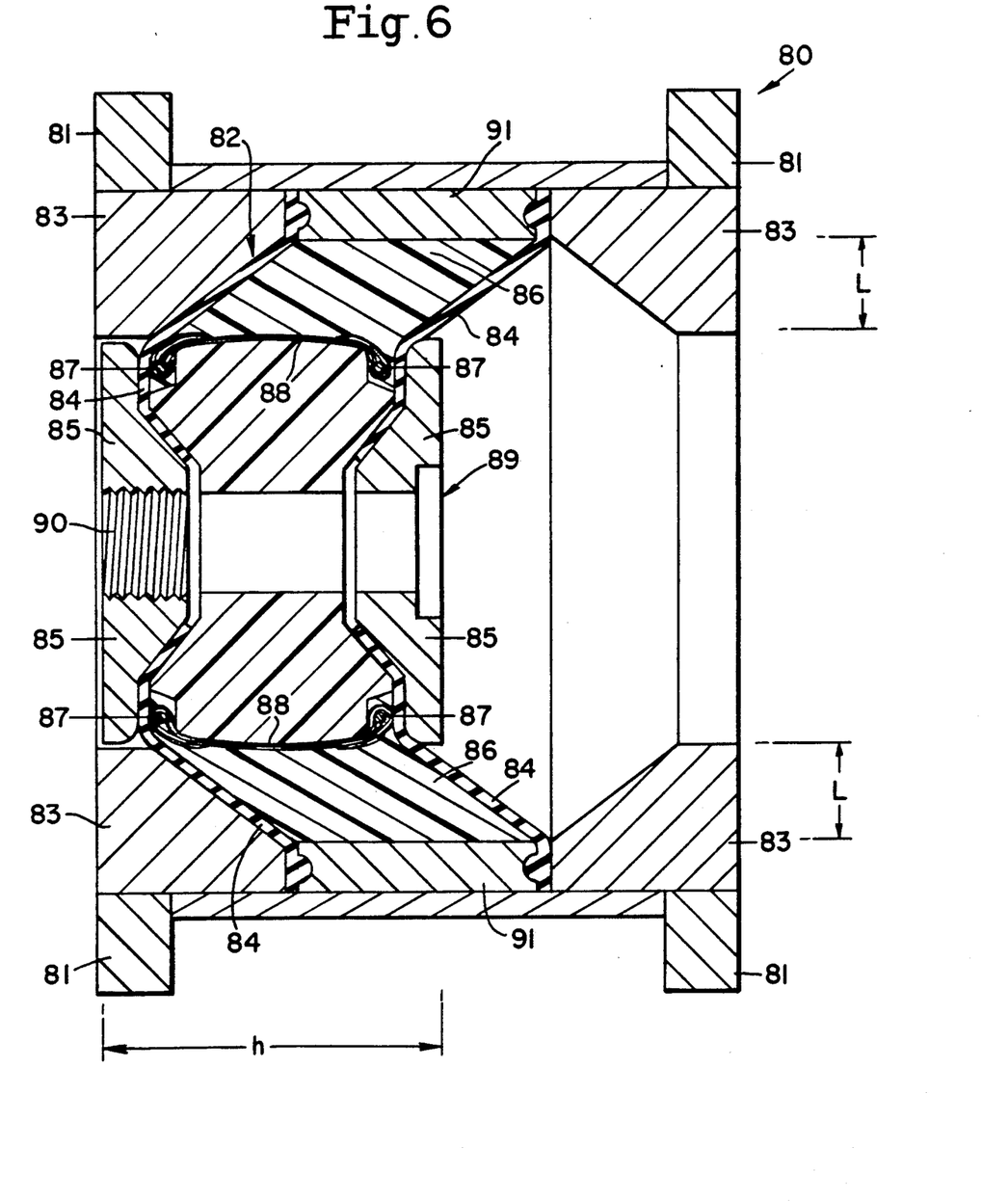
FIG. 6 is a cross-sectional view of another embodiment of the diaphragm for use in an engine according to the present invention.

FIG. 6 depicts the use of diaphragm 82 in another diverse end use, namely, in engine 80. Engine 80 includes engine housing 81, diaphragm 82, sleeve clamp 83, barrier disk 84, clamp ring 85, elastomer 86, steel bead ring 87, tire cords 88, and piston 89. Tire cords 88 are preferably constructed of Aramid. Sleeve clamp 83 and clamp ring 85 are preferably constructed of steel. Barrier disk 84 is provided as a barrier material to protect diaphragm 82 against adverse temperature and environmental conditions, and is preferably constructed of Kalrez. As piston 89 is reciprocated by shaft 90, piston 89 contacts diaphragm 82. This construction provides a durable, environment in which piston 80 operates over a large number of cycles.

Figure 7:
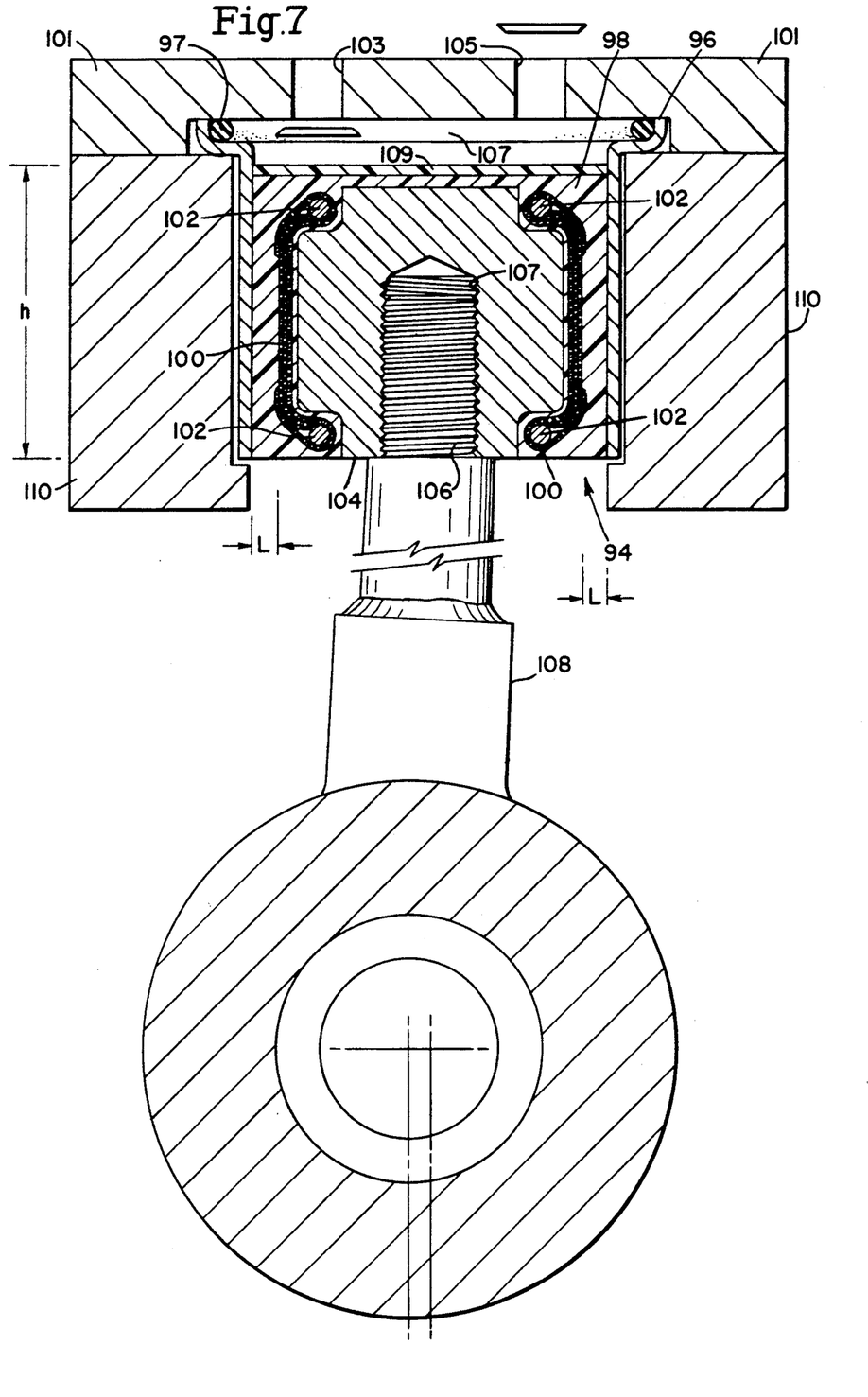
FIG. 7 is a cross-sectional view of another embodiment of the diaphragm according to the present invention.

With reference to FIG. 7, diaphragm 94 is shown in use with drive shaft 108. Diaphragm 94 is comprised of sleeve 96, elastomer 98, tire cord 100, bead 102 and plug 104. Drive shaft 108 has threaded head 106 which mates with threaded hole 107 in plug 104. As shaft 108 rotates, diaphragm 94 deforms within block 110. In prior art drive shafts, a pin (not shown) must be inserted at the point where drive shaft 108 contacts plug 104. This pin is, commonly, one of the places where the piston experiences material failure because of the high stresses that are localized on the pin. In order to alleviate this problem, diaphragm 94 deforms along the sides that contact block 110, to adjust to the swiveling of drive shaft head 106. Consequently, this embodiment eliminates this localized failure because the pin has been eliminated.

Figure 8:
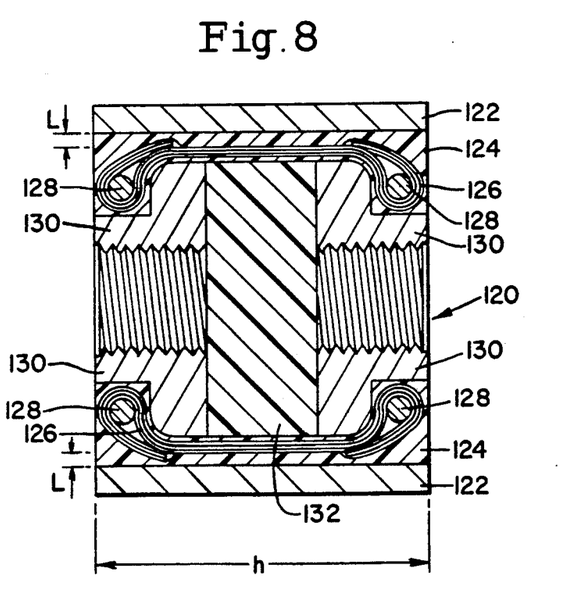
FIG. 8 is a cross-sectional view of another embodiment of the diaphragm according to the present invention.

FIG. 8 depicts another embodiment of the present invention. Diaphragm 120 is comprised of sleeve 122, elastomer 124, tire cord 126, ring beads 128, plug 130 and block 132. Ring beads 128 are preferably constructed of steel. In one particular application of diaphragm 120, diaphragm 120 could be placed on the end of the drive shaft, in order to provide a thermal barrier along the shaft. It is also to be understood that sleeve 122 can be omitted, and that materials such as Teflon, Vespel or nylon could be used in block 132 to provide a primary thermal barrier. Also, block 132 could be made of rubber to provide shock and twist absorption from axial misalignment, axial angle alignment or torque loads. Therefore, diaphragm 120 can be employed in many diverse applications without specialized diaphragms having to be constructed, an advantage which cannot be said of previous prior art diaphragms.

As can be seen in FIGS. 5-8, the length (L) of the respective diaphragms is less than (and in some cases significantly less than) the height (h) of the respective diaphragms. Therefore, the deflections of these short-thick beam diaphragms is relatively small, which allows these short-thick beam diaphragms to be operated at higher pressures and over an extended range of pressures.

With respect to the various diaphragms depicted in FIGS. 1-8, while their construction may have been referenced to a particular end use, such as for use in a pump, it is to be understood that these various diaphragms can be employed in many diverse areas. These include, but are not limited to, applications in a displacement pump, a compressor, a vacuum pump, a motor or numerous other related applications, such as process control valves, air pressure regulators, liquid dispensing equipment, valve positioners, automatic choke controls, distributor vacuum advance mechanisms, irrigation valves, aircraft environmental controls, belt guide actuators, truck brake actuators, automotive emission controls, geothermal pumps, automatic door locks, tank truck valves, water conditioning valves, pneumatic relays, dancer roll actuators, industrial brakes, expansion chambers, automatic transmission modulators, pressure switches, flow control valves, fire sprinkler alarms, domestic hot water regulators, waste gate actuators, fuel pressure controls, vacuum switches, pressure transducers, vacuum regulators, gauge isolators, and linear actuators.

As evidence of the applicability of the diaphragms in FIGS. 1-8, in many diverse areas, the inventor determined, in one particular application, that the various diaphragms in FIGS. 1-8 can replace conventional actuators, pumps and accumulators in a power steering system. In this system, because the short-thick beam diaphragm is being employed, no seals are needed. Hence, the system is closed. Also, because the diaphragms are less expensive, than the prior art devices they replaced, the entire system becomes less expensive. Finally, because the diaphragm would allow the system designer to use a smaller pump and still maintain the same pumping characteristics as conventional pumps, the power requirements of the entire system are reduced.

To provide even stronger evidence of the superior performance of the short-thick beam diaphragm, a test was performed on diaphragm samples as depicted in FIG. 1, and is described below as

EXAMPLE 1

The test stand parameters were:
0.100 in piston travel
2 I.D. specimen cavity
3.4 HP motor
550 RPM at start - 400 RPM after motor repair.
Top assembly height adjustable to control pre-stress on diaphragm.

The test stand produced a cyclic pressure for each revolution, with the maximum being controlled by the amount of pressure added by a hand pump. In most cases, a cycle pressure was recorded at the end of the test by stopping the motor, opening the valve to the gauge, keeping the valve to the hand pump closed, and manually rotating the shaft through one revolution while recording the minimum and maximum pressures. A successful test was defined as one that passed 1,000,000 cycles, with at least 200 psi minimum, 1650 psi maximum for a nominal 1500 psi cycle, with no visible signs of failure when sectioned. The test results of the four diaphragm samples (#1,#2,#3, #4) tested yielded the following results:

1—1,020,000 cycles at 1500 plus psi.
2—1,020,000 cycles at 2000 plus psi.
3—312,000 cycles at 3000 plus psi (test discontinued).
4—10,000,000 cycles at 1500 plus psi.

Tests 1, 2 and 4 passed the minimum test, with test 3 being inapplicable because it was discontinued with no failure. Of even greater importance is the fact that the four samples combined operated at various pressures and at over 12.0 million cycles without any failure of the diaphragm construction.

Once given the above disclosure, many other features, modifications and improvements will become apparent to the skilled artisan. Such features, modifications and improvements are, therefore, considered to be a part of this invention, the scope of which is to be determined by the following claims.

I claim:

1. A diaphragm, comprising:
a plug means having an upper and lower plug that define a channel therebetween; and
a bonding layer secured to said plug means to form a base said bonding layer also being received and retained in said channel between said upper and lower plugs.

2. A diaphragm, according to claim 1, wherein: said bonding layer further comprises tire cord.

3. A diaphragm, comprising:
a plug means having an upper and a lower plug that define a channel therebetween;
a bonding layer secured to said plug means to form a base, said bonding layer also being received and retained in said channel between said upper and lower plugs;
a resilient material secured to said base; and
a cylindrical sleeve that encircles said resilient material and said base, and is secured to said resilient material.

4. A diaphragm, according to claim 3, wherein: said bonding layer is further comprised of calendared tire cords.

5. A diaphragm, according to claim 4, wherein: said tire cords are layers, such that the top layer is bonded to the adjacent layer.

6. A diaphragm, according to claim 4, wherein: said reinforcing means comprises at least three layers of tire cord.

7. A diaphragm, according to claim 5, wherein: said layers of tire cords are biased with respect to one another.

8. A diaphragm, according to claim 3, wherein: said bonding layer and said sleeve are secured by a bonding adhesive.

9. A diaphragm, according to claim 3, wherein: said plug further comprises an aperture therein.

10. A diaphragm, according to claim 3, wherein: said resilient material is an elastomer comprised of natural and synthetic blend rubber.

11. A diaphragm, according to claim 4, wherein: said reinforcement means is wrapped around a bear ring.

12. A diaphragm, according to claim 3, further comprising:
a barrier material is located adjacent said plug.

13. A fluid-handling device, comprising:
a housing which includes a front wall and a cylindrical inner surface closed off at one end by said front wall;
an elongated resilient diaphragm encircled by said cylindrical inner surface, such that said diaphragm is spaced away from said front wall, wherein said diaphragm is comprised of a plug, a tire cord bonding layer, an elastomer and a cylindrical sleeve;
means for attaching said diaphragm to said cylindrical inner surface;
a reciprocating means having a head portion which is embedded in said diaphragm;
wherein said diaphragm and said front wall define a chamber therebetween, a fluid inlet to said chamber being defined in said housing; and
wherein said diaphragm deforms to vary the volume of said chamber responsive to axial reciprocation of said reciprocating means.

14. A device according to claim 13, wherein: said plug is further comprised of an upper and a lower plug, such that said plugs define a channel therebetween.

15. A device, according to claim 13, wherein: said bonding layer and said sheet are secured to said plug and said elastomer, respectively, by bonding adhesive.

16. A device according to claim 13, further comprising:
a barrier member positioned between said elastomer and said front wall.

* * * * *